Jan. 3, 1967 E. P. PAPADAKIS 3,295,629
ACOUSTICAL WAVE TRANSLATION DEVICE
Filed May 28, 1963
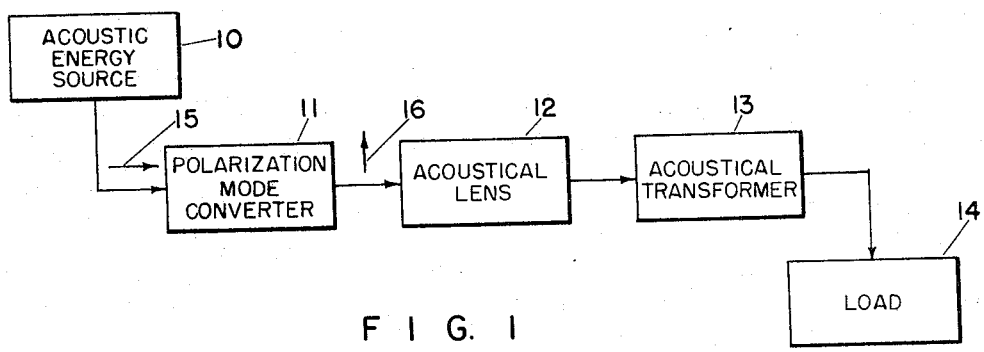
FIG. 1
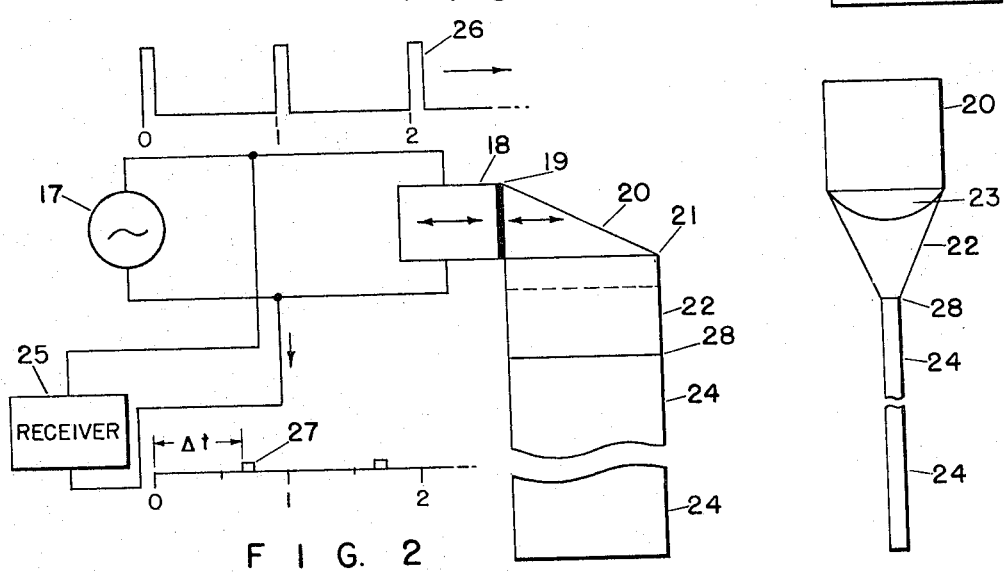
FIG. 2
FIG. 3
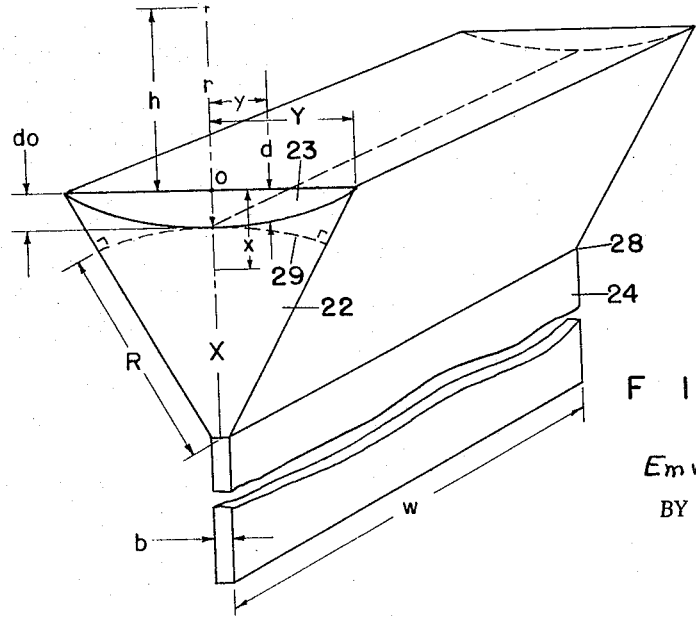
FIG. 4
INVENTOR.
Emmanuel P. Papadakis
BY David A. Rich
ATTORNEY

United States Patent Office 3,295,629
Patented Jan. 3, 1967

3,295,629
ACOUSTICAL WAVE TRANSLATION DEVICE
Emmanuel P. Papadakis, Allentown, Pa., assignor to Man-labs, Inc., Cambridge, Mass., a corporation of Massachusetts
Filed May 28, 1963, Ser. No. 283,946
4 Claims. (Cl. 181—.5)

The present invention relates to wave translation device for acoustic energy. More particularly the invention relates to the generation and application of relatively high frequency high power, shear mode, plane-polarized acoustic energy.

In the prior art there are transducers for generating longitudinal mode, plane-polarized acoustic energy and transducers for coupling this energy into a load such as, for example, a delay line or a test specimen. Such longitudinal mode devices are epitomized, for example, by 5A2330SFB, manufactured by Sperry Products Co.

It is highly desirable to utilize the shear mode of propagation for certain applications. For example, in the case of the delay line there are in general two types of wave forms which may be usefully employed. In the one case a square wave pulse is introduced into the line and a dispersed train of signals is reflected out of the line in accordance with the frequency of the various components of the wave. Such a line is necessarily frequency sensitive.

In many applications, however, it is highly desirable to use a delay line, having a nondispersive characteristic. That is to say, one may introduce, for example, a square wave pulse and the reflected pulse is substantially intact. Such a line is not frequency sensitive and may be used over a relatively broad band of frequencies.

For nondestructive testing of sheet materials, it is frequently desirable to introduce shear mode acoustic energy to reveal defects in the sheet.

Prior art shear mode transducers for generating and coupling shear mode excitation to a load or test specimen are inherently limited. Shear mode transducers are incapable of generating relatively high pressure waves. This is particularly true where the receiving surface of the load is fairly narrow and substantially linear in character.

In many materials the velocity of propagation of shear mode energy is substantially less than that of longitudinal mode energy. In aluminum, for example, this ratio is approximately two to one. For delay lines the amount of delay per unit length which can be obtained is a function of the velocity of the wave. Consequently, it is a considerable advantage to be able to use the shear mode for such applications and obtain a larger delay per unit length of delay line.

In the transmission of acoustic energy through transmission devices of various shapes and forms, one of the problems which arises is the dispersion of the energy in the sense of the relative phase characteristic and consequently in the apparent degeneration of a desired wave front. To overcome this problem, for example, in the prior art various shaped forms are employed to provide a kind of impedance matching from one surface to another. Such devices nevertheless are inherently subject to degeneration or dispersion of the phase front.

It is therefore an object of the invention to provide an improved acoustic wave translation device.

A further object of the invention is to provide an improved acoustic wave translation device for translating shear mode, plane-polarized acoustic energy.

Still another object of the invention is to provide acoustic wave translation system for converting longitudinal mode, plane-polarized energy into shear mode, plane-polarized energy.

Yet another object of the invention is to provide an acoustic wave translation device for coupling greater shear mode energy into a load.

Another object of the invention is to provide a system for translating acoustic energy nondispersively with respect to a plurality of frequency components.

Yet a further object of the invention is to provide a device for translating acoustic energy nondispersively with respect to phase components of a wave front.

Still a further object of the invention is to provide a device for transforming the pressure characteristics of acoustic energy.

In accordance with the invention there is provided an acoustic wave translation device. The device includes input means for receiving acoustic energy. Transmission means are coupled to the input means for transmitting the energy at a selected velocity. Focusing means are coupled to the transmission means in the path of the energy. The focusing means are adapted to transmit the energy therethrough at a predetermined velocity differing from the selected velocity; for producing propagation of the energy in the transmission means with a desired wave front characteristic.

In one form of the invention the transmission means includes a transformer member for transforming a selected pressure characteristic of the energy. In another form of the invention the transformer member is tapered.

In still another form of the invention there is provided an acoustic wave translation system. The system includes an electromechanical transducer adapted to generate longitudinal mode, plane-polarized, acoustic energy in response to a source of high frequency electrical energy. A polarization mode converter means is coupled to the transducer means for converting the polarization from longitudinal to shear mode. The converter means includes a ceramic prism having a reflection angle such that the shear mode is maximized and the longitudinal mode is minimized in a preferred direction. Transmission means are coupled to the converter means for transmitting the energy at a selected velocity along the preferred direction. The transmission means includes an aluminum tapered transformer member for substantially matching the impedance at the converter means to the impedance at a substantially linear output surface. Focusing means are coupled to the transmission means in the path of the energy for converting the plane wave into a cylindrical wave. The focusing means has a tin, focusing member in the form of a cylindrical segment. The velocity of the energy in the focusing member is less than the velocity of the energy in the tapered member. An elongated, ribbon-like, delay line member is coupled to the transmission means for transmitting the energy at the selected velocity for a predetermined time interval.

Other and further objects of the invention will be apparent from the following description, taken in connection with the accompanying drawings, and its scope will be pointed out in the appended claims.

In the drawings:

FIG. 1 is a schematic block diagram of an acoustic wave translation system embodying the invention;

FIG. 2 is a front elevational view, partially schematic, of an acoustic wave translation delay line system;

FIG. 3 is a side elevational view of the system in FIG. 2; and

FIG. 4 is a perspective view of an acoustic wave translation device embodying the invention.

PRINCIPLES OF OPERATION

Mode conversion

Plane-polarized acoustic energy is characterized by its vibration modes. In the longitudinal mode the vibration axis is in the direction of propagation of the energy. The shear mode relates to vibration axes transverse to the direction of propagation. In a planar medium there are two types of shear mode. One of the shear modes is perpendicular to the plane of the medium, and the other is parallel to the plane of the medium. Thus, the vibration axes are mutually orthogonal.

In general it is more convenient to develop and generate the longitudinal mode. In order to convert the longitudinal mode to a shear mode, the energy may be passed through a medium, such as a prism, which, by reflection, converts the longitudinal mode to a shear mode along a preferred axis of propagation. The reflection angle may be so chosen that one obtains either the shear mode or the longitudinal mode or some combination of the two. These principles are discussed in Physical Acoustics and the Property of Solids, by Warren P. Mason, published in 1958, by D. Van Nostrand Co., Inc., of Princeton, New Jersey. In Chapter 2 of that work, starting at page 12, the types of waves transmitted in solids are discussed. The particular problem of the reflection of a longitudinal wave from a plane surface is discussed starting at page 23.

Thus in principle it is possible to obtain a shear wave in a transmission medium by generating a longitudinal mode wave and converting it to a shear mode wave.

*Acoustic transformer*

As noted above, it is frequently desirable to essentially match the impedance of a surface to that of another surface, for example, from a relatively large rectangular surface to a relatively small substantially linear surface. Such a transformation has the effect of changing a pressure characteristic of the acoustic energy. In effect the pressure is transformed from a low pressure, large surface area to a high pressure, small surface area. This is a condition which is frequently realized with an acoustical form, which is in general tapered from the large surface to the small surface. To avoid the problem of phase dispersion within such a transformer, an acoustical lens or focusing device is highly desirable.

In the instant invention a focusing means is employed which converts a plane polarized, plane wave into a plane-polarized cylindrical wave. Focusing action or phase compensation is obtained by using the principle of differential velocities for varying path lengths. Consider for example acoustic energy transmitted through a wedge. All the energy must arrive at the point of the wedge with a desired wave front characteristic, for example, a plane wave. In principle this condition is obtained by introducing constant propagation time regardless of the path of a given wave element or ray. By introducing a medium through which the velocity of propagation is reduced relative to the transmission medium and varying its thickness in the direction of the propagation path in a manner more or less inversely proportional to the length of the path, the desired wave front characteristic may be obtained. It turns out that a cylindrical segment inserted at the base of the wedge is a good approximation to a desired focusing mechanism.

*Delay line*

As noted above, the desired characteristics for a nondispersive delay line imply that the line should not be frequency sensitive. It is also desirable to obtain a maximum delay per unit length of line. For the configuration of a ribbon-like delay line, formed, for example, from aluminum, the shear mode parallel to the plane of the ribbon meets the desired requirement. The parallel shear mode, for example, is nondispersive and its velocity of propagation is substantially less than that of the longitudinal mode, in aluminum, by a ratio of two to one. The perpendicular shear mode, having a vibration axis perpendicular to the plane of the ribbon, is unsatisfactory from the point of view of its susceptibility to dispersion. The stiffness of the material along its width is clearly much greater than through the thickness of the material. Thus a perpendicular shear mode propagation causes the ribbon to undulate along its length and tends to degrade the waveform of a given signal.

DESCRIPTION AND EXPLANATION OF THE WAVE TRANSLATION SYSTEM IN FIG. 1

Referring now to the drawings and with particular reference to FIG. 1, there is here illustrated a schematic block diagram of an acoustic wave translation system embodying the invention. A source of ultrasonic energy 10 is coupled to a polarization mode converter 11. The converter 11 is coupled to an acoustical lens 12, which is in turn coupled to an acoustical transformer 13. The output of the transformer is coupled to a load 14. The output of the acoustic energy source 10 is longitudinal mode, plane polarized energy as indicated by the arrow 15. The longitudinal mode is converted to a transverse mode by the converter 11 as indicated by the arrow 16. Relatively large powers in the longitudinal mode are obtained as compared with a direct source of shear mode energy.

In the system as illustrated longitudinal mode, plane-polarized, plane wave acoustic energy is coupled to the polarization mode converter which converts the energy into a shear mode. The energy is then coupled through the acoustical lens 12, which shapes the wave front, for example, converts the wave front from a plane wave into a cylindrical or other curve form, to correct or compensate for dispersion of the wave in the transformer 13. The transformer 13 matches the impedance at an input surface to the impedance at an output surface coupled to the load 14. As noted above, such a transformer is typically a tapered form.

DESCRIPTION AND EXPLANATION OF THE WAVE TRANSLATION SYSTEM IN FIGS. 2 AND 3

Referring now to FIGS. 2 and 3, there is here illustrated an acoustic wave translation system embodying the invention. A high frequency electrical generator 17 is coupled to a longitudinal mode transducer 18. The transducer 18 is coupled through a viscous medium 19 to a prism 20. The prism 20 is coupled through solid transmitting material 21 to the input of the transformer element 22. As shown particularly in FIG. 3, a member 23 in the shape of a cylindrical segment is inserted at the input of the transformer 22. The face of the transformer 22 at the coupling interface with the prism 20 is a relatively large rectangular surface. The transformer 22 is coupled to a ribbon-like delay line element 24.

A receiver 25 is coupled to the electrical end of the transducer 18. Reflected acoustical pulses produce an electrical output from the transducer 18. The input electrical pulses are indicated by the pulse train 26 and the reflected pulses by the train 27.

In a preferred embodiment the frequency of the generator 17 may be of the order of five megacycles. The transducer 18 may be a model 5A2330SFB manufactured by Sperry Products Co. and formed from ceramic material. The input face of the transformer 22 may be one by one inch, and the viscous material 19 may be glycerine. The transmitting material 21 between the output face of the prism 20 and the transformer 22 may be Salol material. The output face of the transformer 22 at the intersection with the ribbon 24 may be one inch by 0.001 or more inch. The prism 20 is preferably formed from quartz or Pyrex glass.

In the system as shown the generator 17 produces an electrical signal output which is applied to the transducer 18 to generate a longitudinal mode, plane polarized, plane wave. The wave is coupled through the medium 19 to the prism 20 and reflected from the angular surface in the direction of the transformer 22 and the delay line 24. The energy then may travel down the line coupled at the terminus of the line to a receiver. In the preferred mode of operation a pulse of energy from the generator 17 is transmitted through the transducer 18 and prism 19 through the lens 23 transformer 22 to travel along the length of the line 24 and be reflected back.

The reflected acoustic energy is converted into electrical energy by the transducer 18. The electrical energy is coupled to the receiver 25. Included in the receiver 25 is a duplexing means for preventing the reception of the transmitted pulse. An alternate mode of operation is to receive the signal at the terminal end of the line 24 with an appropriate transducer.

DESCRIPTION AND EXPLANATION OF THE ACOUSTIC WAVE TRANSLATION DEVICE IN FIG. 4

Referring now to FIG. 4, there is here illustrated a perspective view of the transformer 22 of FIG. 2. Here the view is enlarged in order to increase the clarity of description with respect to the design principles involved. Given the wedge shaped transformer 22, the shape of the focusing member 23 may be determined. The symbols $C_f$ and $C_t$ relate to the velocities of the acoustic energy in the focusing member 23 and the transformer 22, respectively. As noted above, $C_f$ is less than $C_t$. The radius of curvature of the cylindrical segment 23 is $r$, the radius of the cylindrical wave output from the segment 23 is R, the variable thickness of the segment 23 is $d$, the maximum thickness $d_o$, the half width of the base of the segment 23 is Y. The variable distance from the base center is $y$. The distance from the base center to the intersection 28 is X, the variable distance from the center in the direction of propagation is $x$. The height R is the radius of curvature of the cylindrical wavefront indicated by the curved dashed line 29. The tangent to the wavefront at the side faces of the wedge is indicated as perpendicular.

The thickness $b$ of the delay line should be less than one quarter wave length at the frequency of propagation. The width $w$ should be larger than one half wave length at the operating frequency.

The cylindrical segment 23 effectively converts a shear mode, plane wave polarized normal to the plane of the drawing into a shear mode, cylindrical wave with a shear vibration axis normal to the plane of the drawing in FIG. 3.

For a transformer 22 actually built and tested, there follows a set of dimensions and parameters. It will be understood that the dimensions and parameters may be greatly varied without departing from the scope of the invention.

| | | |
|---|---|---|
| Frequency | megacycles | 5.0 |
| Y | inches | 1.00 |
| X | do | 6.10 |
| R | do | 6.00 |
| $d_o$ | do | 0.10 |
| $b$ | do | 0.01 |
| $w$ | do | 1.00 |
| $h$ | do | 4.81 |
| $r$ | do | 4.91 |
| Element 23 | | Tin |
| Member 22 | | Aluminum |

It will be apparent that the invention has broad application in the art of acoustical devices. The ability to translate signals faithfully is clearly enhanced. The applications for the present invention are great. The invention is useful for delay lines, for material testing purposes, for signalling, and for other data handling processes.

While there has hereinbefore been presented what are at present considered to be the preferred embodiments of the invention, it will be aparent to those of ordinary skill in the art that many modifications and changes may be thereto made without departing from the true spirit and scope of the invention.

It will be considered, that all those changes and modifications which fall fairly within the scope of the invention shall be a part of the invention.

What is claimed is:

1. An acoustic wave translation device, comprising:
    input means having a rectangular surface for receiving shear mode, plane-polarized, plane wave acoustic energy;
    transmission means for transmitting said energy at a selected velocity, said transmission means including a tapered transformer member for substantially matching the impedance at said rectangular surface to the impedance at a substantially linear output surface; and
    focusing means coupling said input means and said transmission means in the path of said energy for converting said plane wave into a cylindrical wave, said focusing means having a focusing member in the form of a segment having a convex cylindrical surface mating with a concave cylindrical surface in the base of said transformer member, the velocity of said energy in said focusing member being less than the velocity of said energy in said tapered member.

2. An acoustic wave translation device, comprising:
    input means having a rectangular surface for receiving shear mode, plane-polarized, plane wave acoustic energy;
    transmission means for transmitting said energy at a selected velocity, said transmission means including a tapered aluminum transformer member for substantially matching the impedance at said rectangular surface to the impedance at a substantially linear output surface; and
    focusing means coupling said input means and said transmission means in the path of said energy for converting said plane wave into a cylindrical wave, said focusing means having a tin focusing member in the form of a segment having a convex cylindrical surface mating with a concave cylindrical surface in the base of said transformer member, the velocity of said energy in said tin focusing member being less than the velocity of said energy in said tapered member.

3. An acoustic wave translation device, comprising:
    input means having a rectangular surface for receiving shear mode, plane-polarized, plane wave acoustic energy;
    transmission means for transmitting said energy at a selected velocity, said transmission means including a tapered aluminum transformer member for substantially matching the impedance at said rectangular surface to the impedance at a substantially linear output surface; and
    focusing means coupling said input means and said transmission means in the path of said energy for converting said plane wave into a cylindrical wave, said focusing means having a tin focusing member in the form of a segment having a convex cylindrical surface mating with a concave cylindrical surface in the base of said transformer member, the velocity of said energy in said tin focusing member being less than the velocity of said energy in said tapered member; and
    elongated, ribbon-like delay line member coupled to said transmission means for transmitting said energy at said selected velocity for a predetermined time interval.

4. An acoustic wave translation system, comprising:
    an electromechanical transducer adapted to generate longitudinal mode, plane-polarized, acoustic energy in response to a source of high frequency electrical energy;
    a polarization mode converter means coupled to said transducer means for converting said polarization from longitudinal to shear mode, said converter means including a ceramic prism having a reflection angle such that said shear mode is maximized and said longitudinal mode is minimized in a preferred direction;

transmission means coupled to said converter means for transmitting said energy at a selected velocity along said preferred direction, said transmission means including an aluminum tapered transformer for substantially matching the impedance at said converter means to the impedance at a substantially linear output surface;

focusing means coupled to said transmission means in the path of said energy for converting said plane wave into a cylindrical wave, said focusing means having a tin focusing member in the form of a segment having a convex cylindrical surface mating with a concave cylindrical surface in the base of said transformer member, the velocity of said energy in said tin focusing member being less than the velocity of said energy in said tapered member; and an elongated, ribbon-like, delay line member coupled to said transmission means for transmitting said energy at said selected velocity for a predetermined time interval.

References Cited by the Examiner

UNITED STATES PATENTS

| | | | |
|---|---|---|---|
| 2,406,391 | 8/1946 | Mason | 181—0.5 |
| 2,525,861 | 10/1950 | Carlin | 181—0.5 X |
| 2,573,168 | 10/1951 | Mason et al. | 181—0.5 X |
| 2,819,771 | 1/1958 | Kock | 181—0.5 |

OTHER REFERENCES

Mason, Physical Acoustics and the Properties of Solids, O. Van Nostrand Co., Inc. of Princeton, N.J., 1958. (P. 12 relied on.)

SAMUEL FEINBERG, *Primary Examiner.*

BENJAMIN A. BORCHELT, *Examiner.*

M. F. HUBLER, *Assistant Examiner.*